United States Patent
Hoang et al.

(10) Patent No.: US 11,816,212 B2
(45) Date of Patent: Nov. 14, 2023

(54) LARGE SCALE ZERO TRUST MALWARE DETECTION

(71) Applicant: Inferati Inc., Bellevue, WA (US)

(72) Inventors: Luong Hoang, Bellevue, WA (US); Amit Mital, Bellevue, WA (US)

(73) Assignee: INFERATI INC., Bellevue, WA (US)

( * ) Notice: Subject to any disclaimer, the term of this patent is extended or adjusted under 35 U.S.C. 154(b) by 0 days.

(21) Appl. No.: 17/229,216

(22) Filed: Apr. 13, 2021

(65) Prior Publication Data

US 2021/0326439 A1    Oct. 21, 2021

Related U.S. Application Data

(60) Provisional application No. 63/010,454, filed on Apr. 15, 2020.

(51) Int. Cl.
*G06F 21/56* (2013.01)
*H04L 9/00* (2022.01)

(52) U.S. Cl.
CPC .............. *G06F 21/56* (2013.01); *H04L 9/008* (2013.01); *G06F 2221/034* (2013.01)

(58) Field of Classification Search
CPC ................................ G06F 21/56; H04L 9/008
See application file for complete search history.

(56) References Cited

U.S. PATENT DOCUMENTS

| | | | |
|---|---|---|---|
| 9,443,075 B2 * | 9/2016 | DiCato, Jr. | H04L 63/1416 |
| 9,646,306 B1 * | 5/2017 | Quigley | H04W 12/128 |
| 10,289,816 B1 * | 5/2019 | Malassenet | G06F 21/14 |
| 10,594,472 B2 * | 3/2020 | Ding | H04L 9/008 |
| 10,673,613 B2 * | 6/2020 | Zheng | G09C 1/00 |
| 10,831,903 B2 * | 11/2020 | Li | H04L 9/008 |
| 11,223,485 B2 * | 1/2022 | Wu | H04L 9/008 |
| 11,323,241 B2 * | 5/2022 | Hoshizuki | H04L 9/008 |
| 2018/0019883 A1 * | 1/2018 | Nishikawa | G09C 1/00 |
| 2018/0091466 A1 * | 3/2018 | Friedman | G06F 40/289 |
| 2018/0278410 A1 * | 9/2018 | Hirano | G06F 16/903 |
| 2018/0373887 A1 * | 12/2018 | Smith | G06F 21/6227 |
| 2019/0327088 A1 * | 10/2019 | Camenisch | H04L 9/14 |
| 2020/0228309 A1 * | 7/2020 | Hoffstein | G06F 17/16 |
| 2020/0374100 A1 * | 11/2020 | Georgieva | H04L 9/0869 |
| 2021/0234668 A1 * | 7/2021 | Manamohan | H04L 9/30 |
| 2022/0094520 A1 * | 3/2022 | Thumparthy | H04L 9/008 |

OTHER PUBLICATIONS

Bajard et al., "A Full RNS Variant of FV like Somewhat Homomorphic Encryption Scheme," 23rd *International Conference on Selected Areas in Cryptography*, St. John's, NL, Canada, Aug. 10-12, 2016, pp. 423-442.

(Continued)

*Primary Examiner* — Viral S Lakhia
(74) *Attorney, Agent, or Firm* — SEED IP LAW GROUP, LLP

(57) ABSTRACT

A malware detection facility is described. In a first computer system, the facility receives from a second computer system ciphertext obtained by subjecting plaintext file contents to homomorphic encryption. In the first computer system, the facility performs a malware detection operation directly on the received ciphertext.

18 Claims, 7 Drawing Sheets

(56) References Cited

OTHER PUBLICATIONS

Chen et al., "Fast Private Set Intersection from Homomorphic Encryption," *ACM SIGSAC Conference on Computer and Communications Security,* Dallas, Texas, USA, Oct. 27, 2017, pp. 1243-1255.

Chen et al., "Labeled PSI from Fully Homomorphic Encryption with Malicious Security," *ACM SIGAC Conference on Computer and Communication Security,* Toronto, Canada, USA, Oct. 19, 2018, pp. 1223-1237.

Cheon et al., "Homomorphic Encryption for Arithmetic of Approximate Numbers," *23rd International Conference on the Theory and Application of Cryptology and Information Security,* Hong Kong, China, Dec. 3-7, 2017, pp. 409-437.

Cheon et al., "A Full RNS Variant of Approximate Homomorphic Encryption," *25th International Conference on Selected Areas in Cryptography,* Calgary, AB, Canada, Aug. 15-17, 2018, pp. 347-368.

Chillotti et al., "TFHE: Fast Fully Homomorphic Encryption over the Torus," *Journal of Cryptology,* 33(2):34-91, 2020.

Fan et al., "Somewhat Practical Fully Homomorphic Encryption, " *Katholieke Universiteit Leuven, COSIC & IBBT,* 19 pages.

Jarecki et al., "Fast Secure Computation of Set Intersection," *7th International Conference of Security and Cryptography for Networks,* Amalfi, Italy, Sep. 13-15, 2010, pp. 418-435.

Pinkas et al., "Faster Private Set Intersection Based on OT Extension," *23rd USENIX Security Symposium,* San Diego, California, Aug. 20-22, 2014, pp. 797-812.

Yan et al., "Detecting Malware with an Ensemble Method Based on Deep Neural Network," *Hindawi Security and Communication Networks,* 2018(1):1-16, 2018.

\* cited by examiner

LARGE SCALE ZERO TRUST MALWARE DETECTION

CROSS-REFERENCE TO RELATED APPLICATIONS

This application claims the benefit of U.S. Provisional Patent Application No. 63/010,454, filed on Apr. 15, 2020 and entitled "LARGE SCALE ZERO TRUST MALWARE DETECTION," which is hereby incorporated by reference in its entirety.

In cases where the present application conflicts with a document incorporated by reference, the present application controls.

BACKGROUND

With the explosion of Internet-powered devices and the fast-rising adoption of cloud computing, companies and organizations heavily rely on the integrity of their computer systems in order to maintain business operations and best serve customers. However, the security of such systems can be undermined and/or exploited by malicious computer hackers around the world. As a result, organizations often spend large sums of money to employ various methods to detect and prevent exploitation. Among these, malware detection has proved to be one of the most popular and effective approaches to protecting a company's digital assets.

DETAILED DESCRIPTION

The inventors have identified cases in which conventional solutions for malware detection are not optimal. Namely, these are cases when companies cannot use cloud malware detection providers because their privacy is not protected during the process. Further, when cloud providers cannot be used, companies frequently opt for an in-house solution to protect privacy, but which can be expensive to build and maintain over time.

In particular, to ensure they have not been breached, large companies must regularly scan their networks and systems for infected files. While there are many existing cloud services for malware detection, the inventors have recognized that companies are often hesitant to use them due to the "signaling" concern: they do not want these services to know that they have been attacked with malware since that creates major regulatory, financial and legal issues.

Accordingly, the inventors have conceived and reduced to practice a software and/or hardware facility ("the facility") that enables cloud providers to perform malware detection in ways that does not reveal the sensitive data to anyone, including the providers themselves. The facility includes various protocols to perform static signature-based malware detection, dynamic behavior-based malware detection, and file binary-based malware detection.

Figure 3:
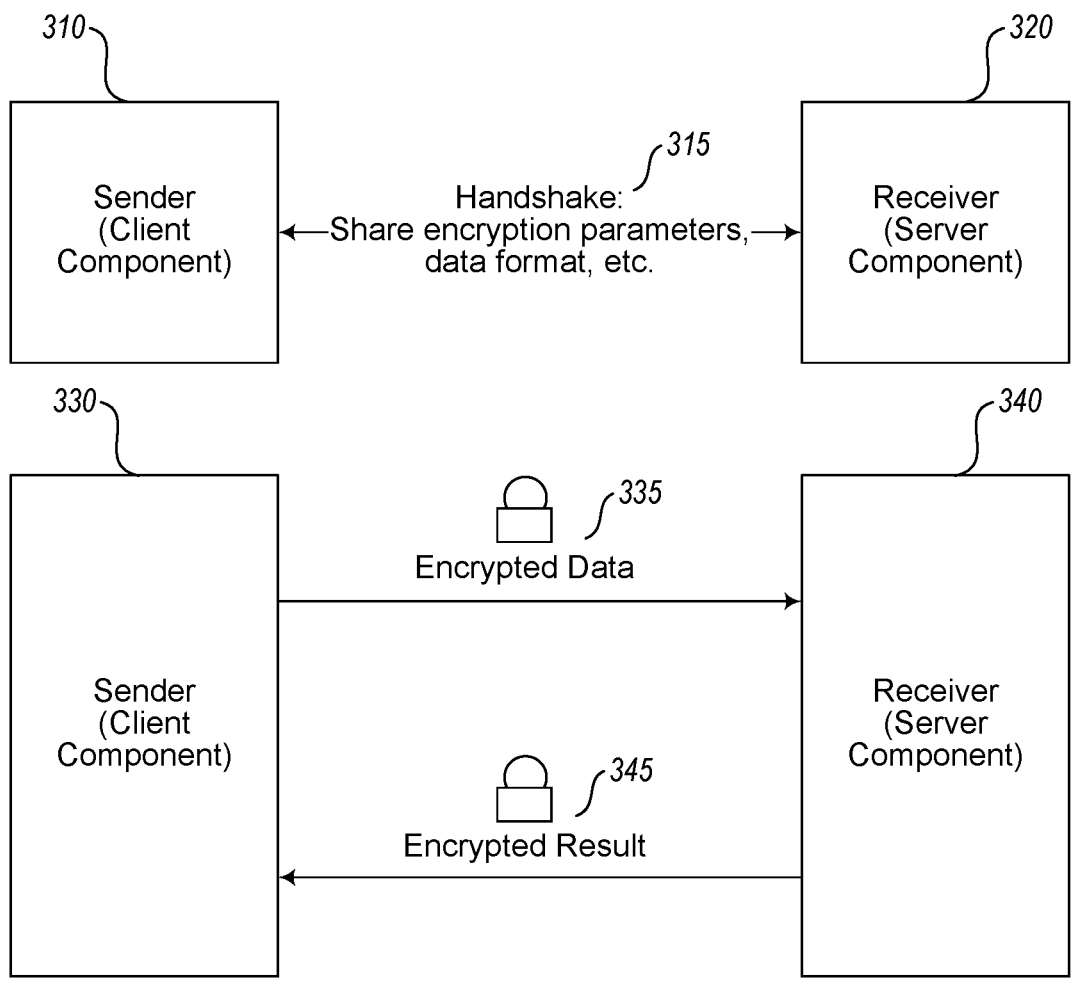
FIG. 3 is a flow diagram showing the overall architecture of the system. At the beginning, the client and server engage in a handshake process to agree on encryption scheme and parameters as well as data format and any other parameters needed to facilitate future interactions. Once the handshake is completed, the client encrypts data and sends to the server, the server performs computation on encrypted ciphertexts and sends the encrypted result back. The client finally decrypts the result to obtain the desired information.

A facility for zero trust malware detection in a two-party setup between a client and a server is described. In some embodiments, the client (or "sender") uses homomorphic encryption to encrypt its data. The encrypted ciphertexts are sent to the server (or "receiver"), who performs the desired processing and returns the encrypted result to the client. The client uses its secret key to decrypt the server's result to obtain the final detection in plaintext. In this way, the client can detect malware while fully preserving its privacy. This process is shown in FIG. 3, discussed below.

Homomorphic Encryption is a technique that allows for encrypting data in a certain way such that the resulting encryption can be directly computed on while preserving the result. In mathematics, a group homomorphism $\phi$ from a group G to a group G' is a mapping from G into G' that preserves the group operation: $\phi(ab)=\phi(a)\phi(b) \forall a, b \in G$. For example, the mapping from Z into $Z_n$, defined by $\phi(m)=m \mod n$ is a homomorphism. For the current discussion, a Homomorphic Encryption method implies the preservation of additive and multiplicative structures of the rings of plaintexts and ciphertexts in the encryption and decryption operations.

Figure 1:
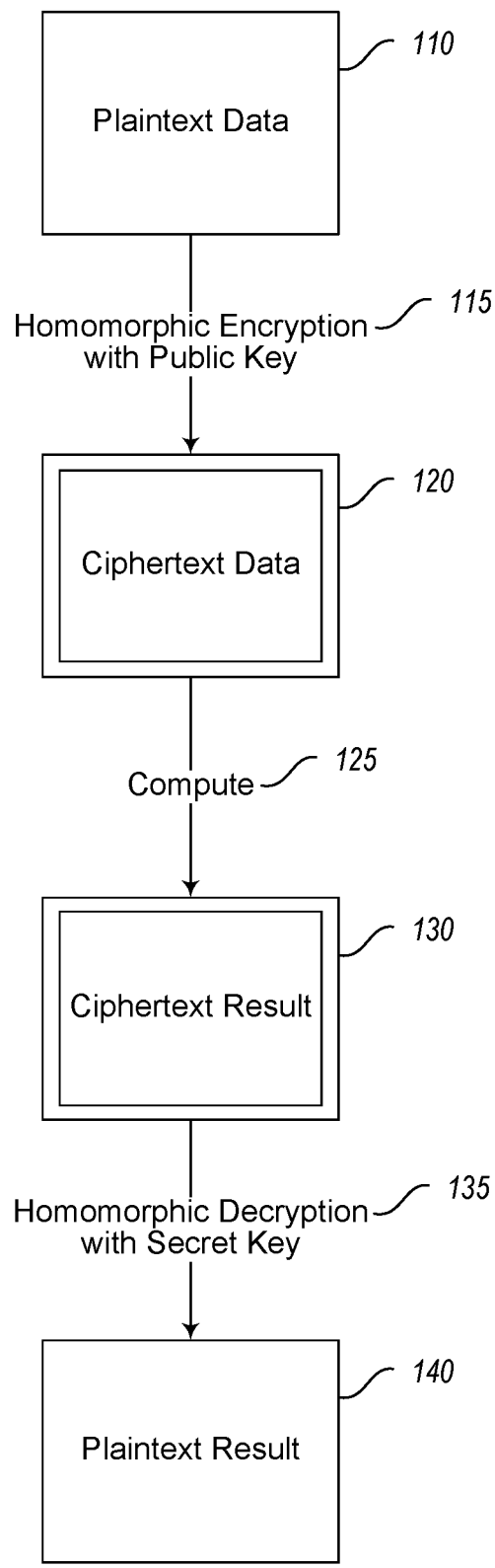
FIG. 1 is a flow diagram showing a process performed by the facility in some embodiments to encrypt input data with a homomorphic encryption scheme using the public key, process the input ciphertext to produce an output ciphertext (or ciphertexts), and decrypt the output ciphertext with the secret key to obtain the plaintext result.

FIG. 1 is a flow diagram showing a process performed by the facility in some embodiments to encrypt input data with a homomorphic encryption scheme using the public key, process the input ciphertext to produce an output ciphertext (or ciphertexts), and decrypt the output ciphertext with the secret key to obtain the plaintext result.

The facility subjects plaintext data 110 to homomorphic encryption with a public key 115 to produce ciphertext 120. The facility performs computations 125 on the ciphertext data to produce a ciphertext result 130. The facility subjects this ciphertext result to homomorphic decryption with a secret key matching the public key 135 to obtain a plaintext result 140 for the computations against the ciphertext version of the data.

Figure 2:
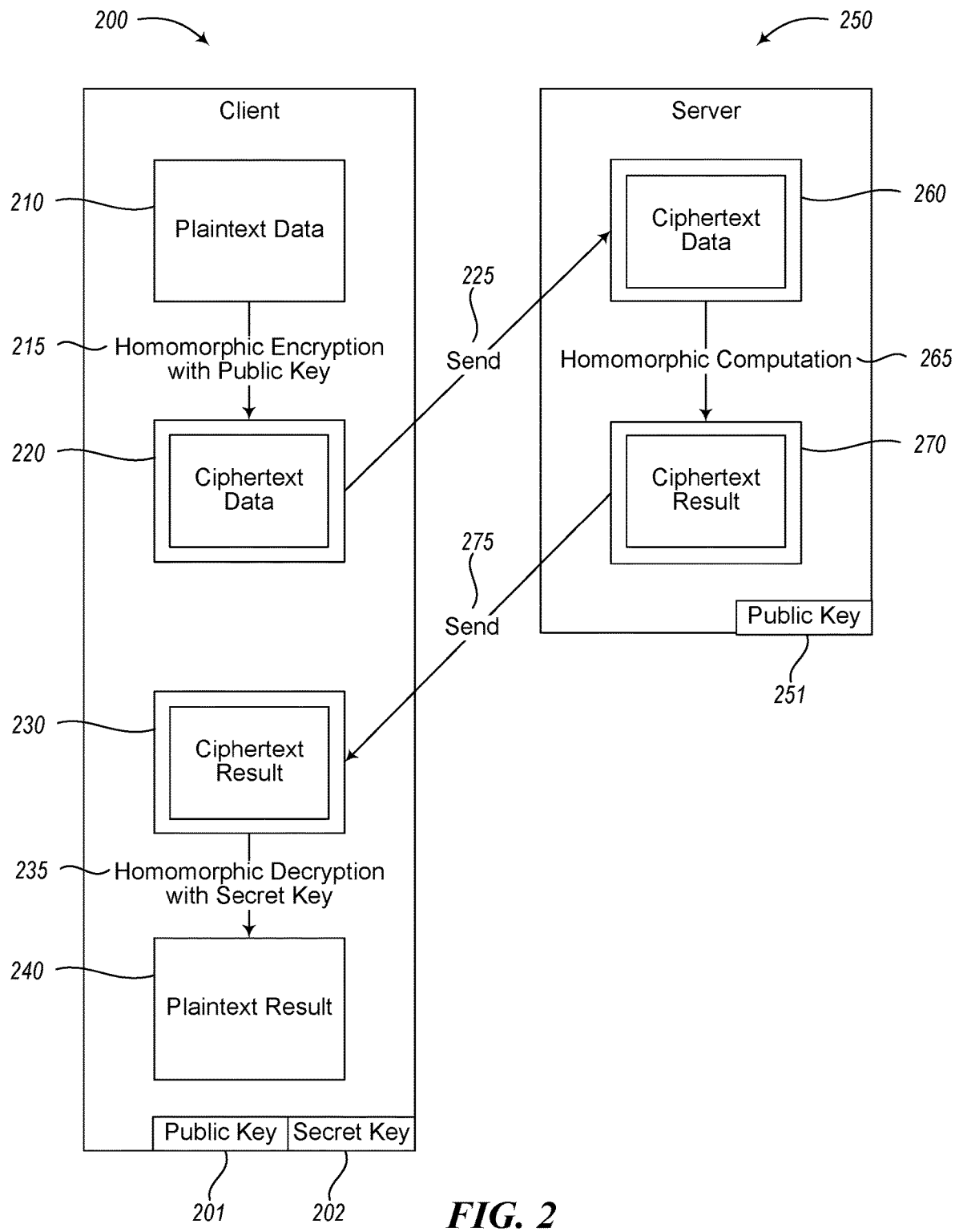
FIG. 2 is a flow diagram showing a client-server homomorphic computation process performed by the facility in some embodiments to encrypt the input data with a homomorphic encryption scheme using the public key on the client, send the input ciphertext to the server, perform some computation on the server to produce an output ciphertext (or ciphertexts), send the output ciphertext(s) back to the client, decrypt the output ciphertext to obtain the plaintext result. Note that in this process, only the client has access to the secret key.

FIG. 2 is a flow diagram showing a client-server homomorphic computation process performed by the facility in some embodiments to encrypt the input data with a homomorphic encryption scheme using the public key on the client, send the input ciphertext to the server, perform some computation on the server to produce an output ciphertext (or ciphertexts), send the output ciphertext(s) back to the client, decrypt the output ciphertext to obtain the plaintext result. Note that in this process, only the client has access to the secret key. On a client 200, the facility subjects plaintext data to homomorphic encryption 215 with a public key 201. The homomorphic encryption produces ciphertext data 220, which the facility sends 225 from the client to a server 250. On the server, the facility subjects the ciphertext data 260 to a homomorphic computation 265 to produce a ciphertext result 270. The server sends 275 the ciphertext result from the server to the client. On the client, the facility subjects the ciphertext result 230 to homomorphic decryption 235 with a secret key 202 possessed by the client. This homomorphic decryption produces a plaintext result 240.

In various embodiments, the facility implements different homomorphic encryption schemes such as: the Brakerski/Fan-Vercauteren scheme (BFV), described by Fan, J., & Vercauteren, F. (2012), Somewhat Practical Fully Homomorphic Encryption, IACR Cryptology ePrint Archive, 2012, 144, which is hereby incorporated by reference in its entirety; the Cheon-Kim-Kim-Song (CKKS) scheme, described by Cheon, J. H., Kim, A., Kim, M., & Song, Y. (2017, December), Homomorphic encryption for arithmetic of approximate numbers, In International Conference on the Theory and Application of Cryptology and Information Security (pp. 409-437), Springer, Cham, which is hereby incorporated by reference in its entirety; and the TFHE scheme, described by Chillotti, I., Gama, N., Georgieva, M., & Izabachène, M. (2020), TFHE: fast fully homomorphic encryption over the torus, Journal of Cryptology, 33(1), 34-91, which is hereby incorporated by reference in its entirety. In various embodiments, the facility also implements an improved version of the BFV scheme, described by Bajard, J. C., Eynard, J., Hasan, M. A., & Zucca, V. (2016, August), A full RNS variant of FV like somewhat homomorphic encryption schemes, In International Conference on Selected Areas in Cryptography (pp. 423-442), Springer, Cham, which is hereby incorporated by reference in its entirety; and/or an improved version of the CKKS scheme, described by Cheon, J. H., Han, K., Kim, A., Kim, M., & Song, Y. (2018, August), A full RNS variant of approximate homomorphic encryption, In International Conference on Selected Areas in Cryptography (pp. 347-368), Springer, Cham, which is hereby incorporated by reference in its entirety.

Handshake: In some embodiments, the facility implements a security level for the homomorphic encryption scheme by setting default values for a number of parameters such as: the degree of the polynomial modulus n, the ciphertext coefficient modulus q and the plaintext modulus t, a noise standard deviation σ, etc. At the beginning, before any data sharing or computation takes place, the client and server will participate in an initial exchange ("the handshake") to agree on the encryption scheme and the security level (128-bit or 256-bit etc. . . . ). The handshake may also determine other parameters such as the format/structure of the data to be shared, or any data cleanup/preprocessing has been done so that the server may carry out computations according to the specification. The facility adopts these parameter values in both the client and the server components to ensure consistent encryption and expected computation result.

Facility Setup: In some embodiments, the facility includes two components: the client component and the server component. The client component is utilized by the client to encrypt and decrypt data. The server component is used by the server to perform homomorphic computations on ciphertexts. Both components can carry out the handshake protocol to determine the prerequisite parameters.

FIG. 3 is a flow diagram showing the overall architecture of the system. At the beginning, the client and server engage in a handshake process to agree on encryption scheme and parameters as well as data format and any other parameters needed to facilitate future interactions. Once the handshake is completed, the client encrypts data and sends to the server, the server performs computation on encrypted ciphertexts and sends the encrypted result back. The client finally decrypts the result to obtain the desired information.

FIG. 3 shows the overall data flow of the facility with the client (or sender) and server (or receiver) first performing the handshake protocol and then continue with normal data transactions. Here, the encrypted data contains any data necessary about the suspecting file so that the server can adequately perform its malware detection process. First, the sender/client 310 and receiver/server 320 perform a handshake 315 in which they share encryption parameters, a data format, and any other information needed in order to exchange encrypted data. After the handshake, the sender/client sends encrypted data 335 to the receiver/server 340, which replies with an encrypted result 345.

Malware Detection Background: Malware is malicious software that is designed to exploit a computer system, such as to exploit a bug in other legitimate software, without the consent of the owner. Malware detection is a process to determine whether a specific program or software is malicious or benign. At high level, malware detection can be classified into two categories: static detection and dynamic detection. Static detection analyzes a given file without running it. This typically involves generating a unique signature string given the file's binary data, such as a MD5, SHA-1 or SHA-256 hash, and comparing it against a predefined list of signatures that are known to belong to malicious files. On the other hand, dynamic detection attempts to execute the given file within a controlled system or environment so that its behavior can be observed. The generated behavior data includes API calls, instruction traces, registry changes, network and system calls, memory writes etc. . . . . This data can then be fed into a detection algorithm, such as a heuristics-based or machine learning algorithm, to determine if the provided behavior data belongs to a malicious program.

Static Detection: One way of detecting malware statically is via hash-based signature comparison. In this method, the detection algorithm first computes a unique string that can identify a given suspicious file based on its binary content. This unique string, or signature, is commonly the hash, such as MD5, SHA-1 or SHA-256 hash, of the binary data. The detection engine then compares the generated signature string against a large database of known malicious signatures, typically containing hundreds of millions or a few billion strings. In addition, each known malicious signature in the database also corresponds to extra data such as the type of malware it is. The goal of the detection engine (running on the server) is to return to the user (or client) whether the given string belongs to a malicious program, and if so then what type of malware it is.

The inventors have recognized that when data are in plaintexts, static malware detection resolves to a simple database lookup where the query identifier is the suspicious file's signature and the result is the label of the malware (or NULL if it is not). In the plaintext setting, the server can employ numerous optimization tricks such as indexing, partitioning, etc. . . . to enable the lookup to run in real-time. However, when the input data have been encrypted into ciphertexts, such tricks no longer work because the server itself cannot see the data and thus cannot apply binary search or lookup operations. Instead, informally speaking, the server must resort to a full scan against every string in its database to compute a match and return the encrypted label. However, in case of malware detection, the server's database may contain a very large number of items, e.g., billions of items. In addition, homomorphic computations are expensive and slow to execute. Thus, if done naively, the detection process can be extremely inefficient. To significantly optimize this, in some embodiments, the facility implements and modifies the methods outlined in Chen, H., Laine, K., & Rindal, P. (2017, October), Fast private set intersection from homomorphic encryption, In Proceedings of the 2017 ACM SIGSAC Conference on Computer and Communications Security (pp. 1243-1255), which is hereby incorporated by reference in its entirety, and Chen, H., Huang, Z., Laine, K., & Rindal, P. (2018, January), Labeled PSI from fully homomorphic encryption with malicious security, In Proceedings of the 2018 ACM SIGSAC Conference on Computer and Communications Security (pp. 1223-1237), which is hereby incorporated by reference in its entirety. The facility applies these methods to static malware detection.

More formally, let the server's malware database be a set of $N_X$ signature strings $X=\{x_1, x_2, \ldots, x_{N_X}\}$ which correspond to a set of $N_X$ labels (i.e., the type of malware for each string) $L=\{l_1, l_2, \ldots, l_{N_X}\}$. Let the client's query signature string be y and denote $\hat{y}$ as its homomorphically encrypted version. Note that the sets $\{x_i\}$, $\{l_i\}$, reside on the server and do not need to be encrypted. In traditional plaintext system, a straightforward method is to compare $y=x_i$ for each $i \in \{1, \ldots, N_X\}$. However, as the server only receives $\hat{y}$ it cannot perform any comparison. Instead, it must carry out computations which can return the desired result while being oblivious to y.

At a high level, the server homomorphically computes a polynomial $F(\hat{y})=\Pi_i(\hat{y}-x_i)$, which returns an encrypted ciphertext containing zero if the given y matches any string in the database, and nonzero otherwise. When the result is sent to the client for decryption, the client can check if the value is zero and conclude that its file is determined by the server as malicious. In addition, for the server to also return the label (i.e., what type of malware it is), the server prepares a polynomial function G such that $G(x_i)=l_i$. This can be done using interpolation methods such as the Newton interpolation algorithm. Thus, given $\hat{y}$, the server computes and returns $F(\hat{y})$, $G(\hat{y})$ and the client first decrypts $F(\hat{y})$ and checks if it is zero, if so the label is the decryption of $G(\hat{y})$. For more complete details, we defer to Chen, H., Huang, Z., Laine, K., & Rindal, P. (2018, January), Labeled PSI from fully homomorphic encryption with malicious security, In Proceedings of the 2018 ACM SIGSAC Conference on Computer and Communications Security (pp. 1223-1237), which outlines the Labeled Private Set Intersection protocol with step-by-step operations needed by the client and server, including offline preprocessing and online interactions. Here, to simplify and facilitate further discussion, we describe informally how this protocol is applied to Static Malware Detection as follows:

Single-Database Static Malware Detection Protocol (SDP)
1. The client and server initially agree on the encryption parameters, security settings, and other parameters required to carry out the protocol. This step needs to be done only once before their interactions begin.
2. In the offline phase, the server preprocesses its database of $\{x_i\}$ signatures, which include:
   a. Transforming $\{x_i\}$ to $\{x_i'\}$ using an oblivious pseudo-random function (OPRF)
   b. Hashing $\{x_i'\}$ to a predefined number of bins (determined in step 1)
   c. Splitting each bin into a predefined number of partitions (determined in step 1)
   d. Pre-computing the coefficients of the polynomials F and G
   e. Batching the coefficients in step (d) to store them as slots in multiple plaintexts
3. In the online phase, the client preprocesses its set $Y=\{y_1, \ldots, y_{N_Y}\}$ of query strings as follows:
   a. Transforming $\{y_j\}$ to $\{y_j'\}$ via a single round-trip interaction with the server to compute the same OPRF function as in (2.a)
   b. Cuckoo hashing $\{y_j'\}$ into a predefined number of bins (same as that used in (2.b))
   c. Batching the resulting hash table to store its entries as slots in multiple plaintexts
   d. Computes extra powers of $\{y_j'\}$ using the "windowing trick" and encrypts them
4. In the online phase:
   a. The client sends the encrypted ciphertexts from (3.d) to the server
   b. The server homomorphically computes all powers of $\{\hat{y}_j'\}$ as needed
   c. The server computes $F(\hat{y}_j')$, $G(\hat{y}_j')$ using the coefficients pre-computed in (2.d)
   d. The server sends the encrypted results back to the client
   e. The client decrypts $F(\hat{y}_j')$ and $G(\hat{y}_j')$ to obtain the desired result.

In some embodiments, the facility implements steps SDP.1-SDP.4 in various components to efficiently carry out the protocol. In particular, the facility implements step SDP.1 as part of the handshake protocol for the client and server to agree on encryption parameters, security settings, hashing scheme parameters such as the number of bins, number of partitions etc. . . . . The facility implements step SDP.2 as part of the server component to preprocess its database at initialization time. The facility implements step SDP.3 as part of the client component to handle the preprocessing needed, encryption, decryption, and interpretation of the server's result. Finally, the facility implements steps (SDP.4.b-d) as part of the server component to handle the core detection algorithm.

Large Item Length: Due to the large bit size of the output of some modern hashing algorithms (such as 512 bits for SHA-512), each file signature may be larger than the protocol can support by default. However, the total number of known malicious signatures in the server may be a significantly smaller number. For example, the file signatures may be 512-bit long but there are only 10 billion known malicious strings ($\approx 2^{33.2}$). Thus, the signatures may be further hashed into the smaller space of, e.g., 40 bits so that the resulting strings to be used in the protocol are only 40-bit long. In some embodiments, the facility implements the method outlined in Pinkas, B., Schneider, T., & Zohner, M. (2014), Faster private set intersection based on {OT} extension, In 23rd {USENIX} Security Symposium ({USENIX} Security 14) (pp. 797-812), which is hereby incorporated by reference in its entirety, to hash the items into smaller domains to appropriately minimize the probability of hash collision.

Single-Item Query: In some embodiments, the facility implements support for the special case where the client only has 1 signature string to be queried, instead of a set of strings. In this case, the cuckoo hashing step SDP.3.b is no longer needed and instead can be replaced by any hash function. The facility additionally ensures the same hash function is used in SDP.2.b to hash $\{x_i'\}$ so that items are consistently hashed into their appropriate bins, i.e., for any x=y, hashing x and y will place them into the same bin (otherwise the protocol would fail). In some embodiments, the facility implements a random hash function which assigns an item into a random bin, but which always hashes the same item to the same bin. This hash function is shared by the server with the client during the handshake protocol so that the client can later hash its string using the same function. To reduce the communication required in the handshake step, the facility alternatively hardcodes such hash function into both the client and server components.

Client Component Implementation: In some embodiments, the facility implements the client component as a native desktop application that can run in any operating system such as Windows, Mac, or Linux. In some embodiments, the facility implements the client component as a Javascript library which can run in any web browser such as Chrome, Firefox, Safari, and Edge. The client desktop application handles all the necessary preprocessing, encryption, decryption, and postprocessing step needed to carry out the detection process from end to end. The client application enables the users to choose one or more files for detection, upon which the client application automatically extracts the appropriate signatures for such files. In some embodiments, the facility hardcodes the format of the file signatures to be generated. Here, the format indicates how the signature should be generated, e.g., using MD5 or SHA-512. Thus, without the need to wait for the handshake protocol, the client application can generate file signatures as soon as the files are selected. Alternatively, the facility implements support for the client application to first engage in a handshake protocol with the server to learn the signature format before proceeding with file selection. In some embodiments, the client application uses the open-source Microsoft SEAL library to handle any homomorphic operations required. Alternatively, the facility also implements certain encryption algorithms from scratch to optimize the performance of homomorphic operations. The client application must be connected to the Internet in order to post HTTPS data to the server and receive the detection result.

Security: The inventors have recognized that the security of the system is paramount to protecting user data and server data. While homomorphic encryption is provably secure, it is malleable, i.e., an attacker with the right public keys can manipulate the content of an encrypted ciphertext. As a result, the honest user's encrypted data can be modified to produce results as desired by the attacker. To prevent this from happening, in some embodiments, the facility employs standard security techniques such as digital signatures, digital certificates, SSL to protect data traveling both ways (from the client to server and from server to client). The facility takes appropriate measures to verify that the (homomorphically encrypted) request message is indeed coming from a valid client and has not been modified. Similarly, the facility takes appropriate measures for the client to ensure that the (homomorphically encrypted) result is indeed coming from the server and has not been modified. Further, to additionally protect any homomorphically encrypted message coming from either side, the communication is always handled via a secure channel. That is, in some embodiments, the facility implements SSL communication between the client and server so that all messages, which have already been homomorphically encrypted, are encrypted again with SSL encryption.

Multi-Database Support: The inventors have recognized that static malware detection has a higher efficacy if the server has access to a larger collection of known malicious signatures. As threat actors can change malware signatures over time, the larger the database is, the more likely that static detection is able to catch an infected file. For example, some cloud service providers such as VirusTotal allow users to query a suspicious signature against many threat intelligence databases at the same time (e.g., ClamAV, Avast, FireEye, McAfee, etc. . . . ). Thus, in some embodiments, the facility implements support for multiple malware databases such that a given client's query signature string is obliviously checked against all databases and the facility returns ciphertexts encrypting the detection result from each database. In this scenario, the facility implements a modified protocol as follows:

Multi-Database Static Malware Detection Protocol (MDP)
1. Same as SDP.1
2. In the offline phase, the server executes SDP.2 for every malware database it has access to, resulting in multiple pairs of polynomials $\{(F_1, G_1), (F_2, G_2), \ldots\}$
3. Same as SDP.3
4. In the online phase:
   a. Same as SDP.4.a
   b. Same as SDP.4.b
   c. The server computes $F_i(\hat{y}_j')$, $G_i(\hat{y}_j')$ for every pair $(F_i, G_i)$
   d. Same as SDP.4.d
   e. The client decrypts $F_i(\hat{y}_j')$ and $G_i(\hat{y}_j')$ to obtain the desired result.

Large-Scale Implementation 1: In some embodiments, the facility implements the MDP protocol as part of a cloud software service which is elastic and scalable to support large number of requests coming from different concurrent client applications. The cloud service consists of 3 components: Front-End Server, Message Store, and Detector. The Front-End Server is responsible for directly receiving requests coming from client applications and forwarding them to the Message Store. Thus, the Message Store is a collection of client request messages. The Detector retrieves messages from the Message Store and proceeds with the rest of the detection protocol. Once detection results are produced, they are sent back to the Front-End Server which forwards to the client applications.

Since the Front-End Server is responsible for directly receiving and sending requests from/to client applications, it must be persistent so that in case of failures, data can be replayed and passed on to the next component. The Front-End Server is also elastic and automatically scales according to the volume of incoming requests. In some embodiments, the facility implements the Front-End Server as a set of load-balanced service workers on Microsoft Azure cloud to satisfy these requirements. Thus, the Front-End Server sits behind a load-balanced endpoint which routes requests in a round-robin fashion to the next available worker.

In some embodiments, the facility implements the Message Store using any one of the following services: Microsoft Azure Queue, Service Bus, Event Hub. In some embodiments, the facility implements the Detector as a set of service workers on Microsoft Azure cloud that can easily scale up or down depending on the volume of messages arriving. The Detector workers then subscribe to the messages from the Message Store to receive and process client requests. As client request messages may exceed the size limit allowed by the Message Store, in some embodiments, the facility splits each request message into multiple parts and ensures all parts are received by the same Detector worker. The entire cloud service architecture is illustrated in FIG. 4.

Figure 4:
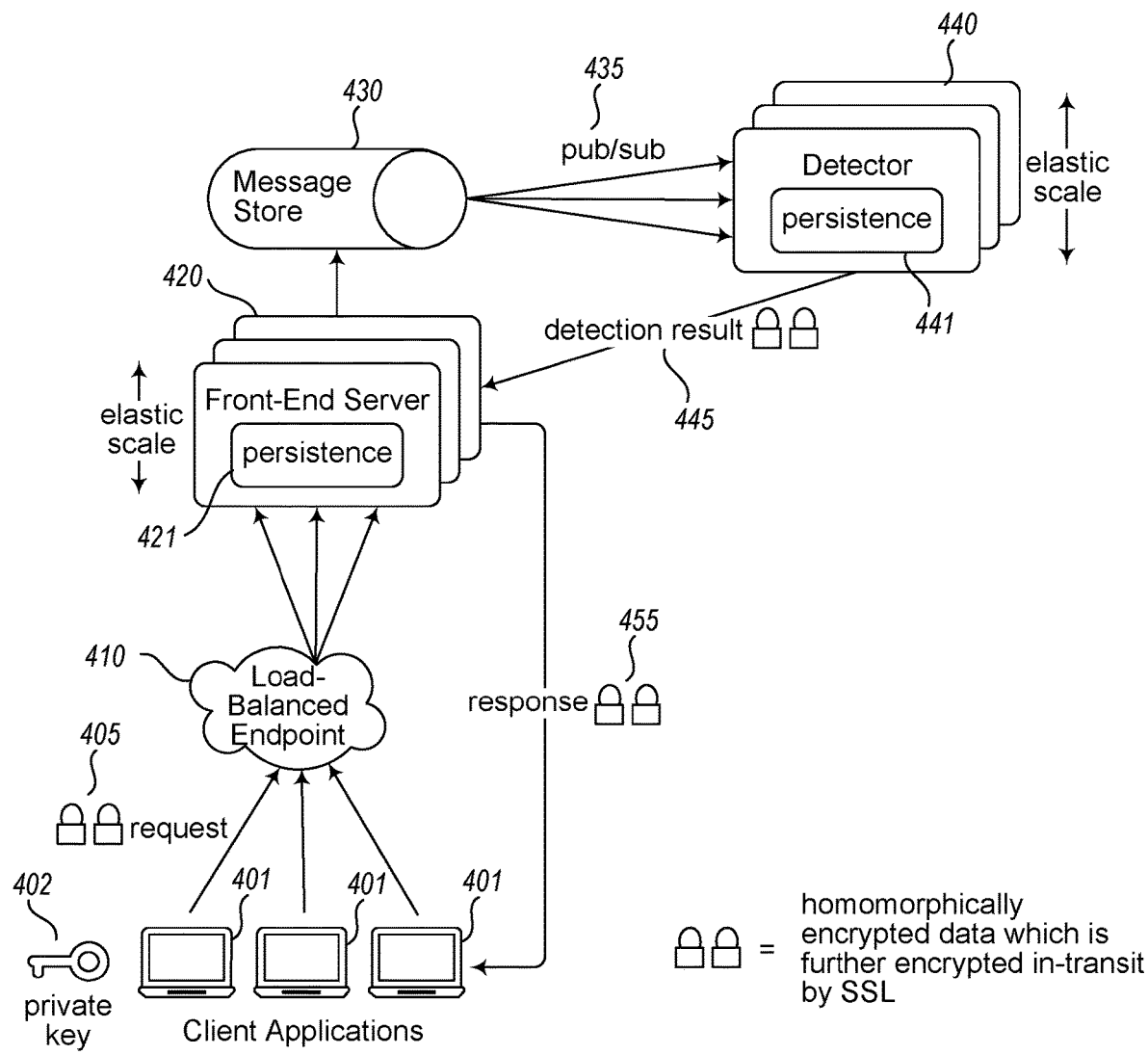
FIG. 4 shows the high-level architecture of a large-scale cloud service implementation for zero-trust malware detection. The client application homomorphically encrypts data and sends them over secure channel, which encrypts the content again for transit. The cloud load-balanced endpoint routes the client's request message to the appropriate Front-End Server. The Front-End Server contains a persistence layer to store messages for fault-tolerance handling. The request messages are pushed onto a Message Store which implements a pub/sub model so that the Detector can receive messages for processing. The results are sent to the Front-End Server who forwards them to the proper clients.

FIG. 4 shows the high-level architecture of a large-scale cloud service implementation for zero-trust malware detection. The client application homomorphically encrypts data and sends them over secure channel, which encrypts the content again for transit. The cloud load-balanced endpoint routes the client's request message to the appropriate Front-End Server. The Front-End Server contains a persistence layer to store messages for fault-tolerance handling. The request messages are pushed onto a Message Store which implements a pub/sub model so that the Detector can receive messages for processing. The results are sent to the Front-End Server who forwards them to the proper clients.

Client applications 401, each possessing a private key 402, use the private key to homomorphically encrypt data sent in a request 405 to a load-balanced endpoint 410. In addition to the homomorphic encryption, the entire request is additionally encrypted in transit using SSL. The load-balanced endpoint distributes the requests it receives to one of a group of front-end servers 420 that each maintain certain persistence state 421. In some embodiments, the facility dynamically scales the number of front end servers in operation based upon the present load level being received by the load-balanced endpoint and/or the individual servers. The front-end servers process the requests for storage in a message store 430. These are published 435 to subscribing detectors 440 in a group of detectors, which also have a persistence state 441 and are elastically scaled. These detectors detect malware in each message they process, and for each send a detection result 445 back to one of the front-end servers, such as the front-end server that initially processed the request containing the message. These detection results are homomorphically encrypted, and further encrypted using SSL while in transit. The front-end server that receives a particular detection result sends a response 455 to the client application that originated the request. This response, too, is homomorphically encrypted, and further encrypted using SSL for transit.

Multi-Database Support: In some embodiments, to handle multiple malware databases, the Detector workers are divided such that there are multiple workers handling requests for each database. Because each client request must be checked against all malware databases, for each database every request is forwarded to the Detector worker handling that database. Thus, the Detector workers can be logically grouped into multiple worker groups, where each group contains a set of load-balanced cloud workers handling one database. To optimally choose the Detector worker to balance the load among all workers, the facility selects the next worker with the minimum load. Here, the facility defines a worker's load as either the number of messages it's currently processing, or the computational load measured by OS metrics such as CPU & Memory utilization. This process is shown in FIG. 6.

Figure 6:
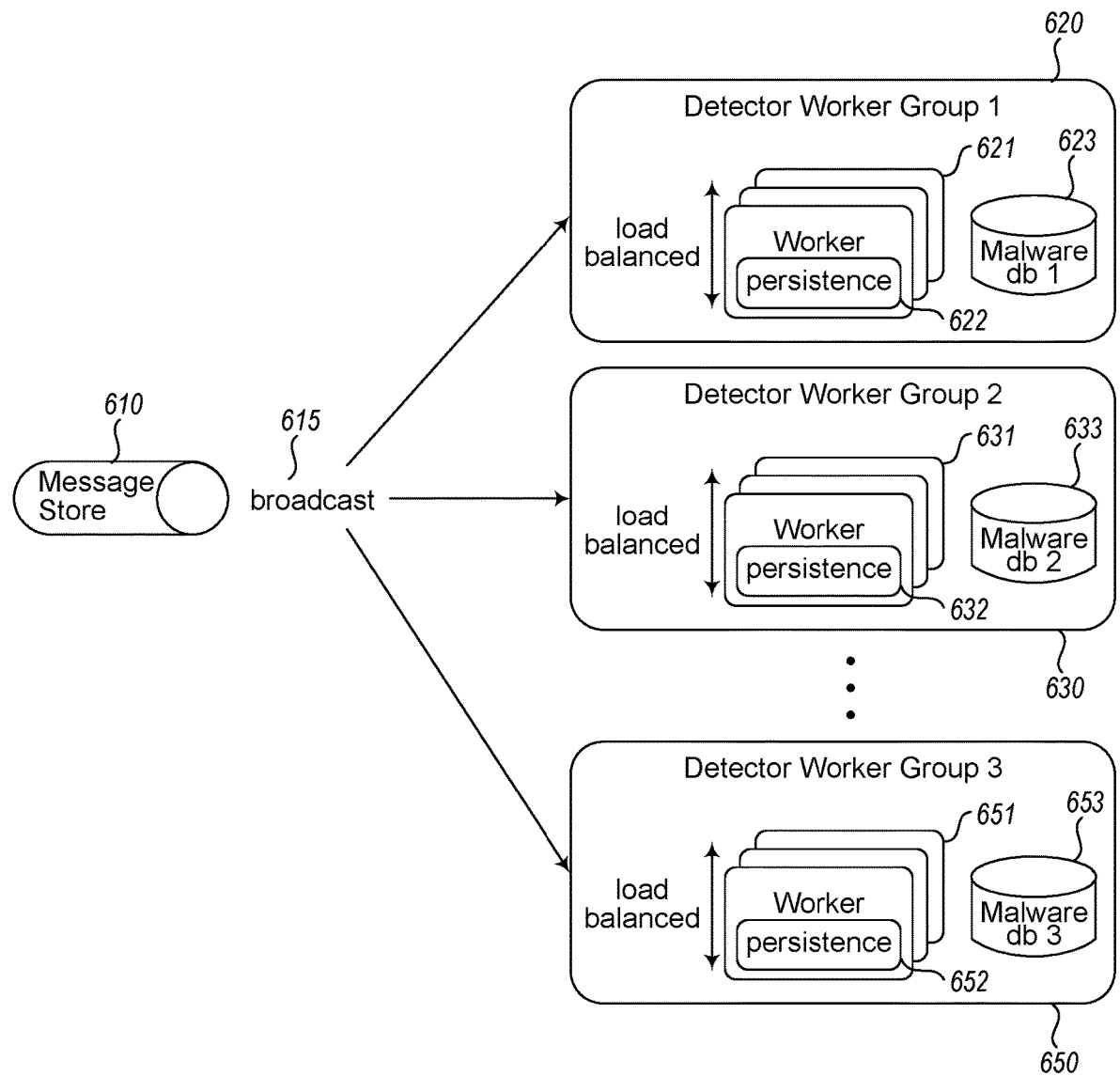
FIG. 6 depicts the architecture of the Detector component when there are multiple malware databases. The Detector contains multiple worker groups, each of which corresponds to one malware database. A client request message is broadcasted to all groups. Within each group, the message is routed to the proper worker determined by load balancing.

FIG. 6 depicts the architecture of the Detector component when there are multiple malware databases. The Detector contains multiple worker groups, each of which corresponds to one malware database. A client request message is broadcasted to all groups. Within each group, the message is routed to the proper worker determined by load balancing. A message store 610 broadcasts a client request message 615 represented in the message store to each of a number of detector worker groups 620, 630, 650, etc. Each of these detector worker groups has a load-balanced group of detector workers, e.g., 621, each having persistent state, e.g., 622. Each detector worker group further has a malware database, e.g., 623.

For maximum performance, the database is loaded onto the memory of each cloud worker at initialization time. Thus, computations can happen entirely within each worker itself. In addition, when each database is small enough that multiple databases can fit into the memory of a single Detector worker, in some embodiments, the facility creates logical Detector worker groups such that one group may handle multiple databases, where each worker in the same group is identically loaded and processes the same set of databases. This approach can lead to reduced cloud maintenance cost as the number of workers is reduced.

Once a Detector worker finishes its computation, it must send the result back to either the Front-End Server or the appropriate client application. In some embodiments, when the Front-End Server receives a request message from the client, it adds to the message its own address and identifier so that when the Detector worker is done with processing, it can send the result back to the address in the message. As there are multiple workers in the Front-End Server, this address helps to uniquely identify which worker originally sent the message and needs the result back. Alternatively, in some embodiments, the Front-End Server adds to the client request message the public address of the client application itself so that the Detector worker can send result directly to the client without needing the extra hop to the Front-End Server.

In some embodiments, the facility implements and maintains the persistent storage in the Front-End Server as follows. When a Front-End Server worker receives a client message, it immediately stores the message in its local storage along with the receipt timestamp and an ID, which could be a combination of a locally generated unique ID and the client's ID. If the worker were to die for any reason, upon restart it will check the persistent store and send off any messages that is not too old. Here, the facility defines a staleness parameter to control how long the message can wait until it is processed (e.g., 10 minutes). When the Front-End Server worker receives the detection result back from the Detector, it first sends it back to the client. Then, it double-checks that it has a corresponding request message in the store and if so the request message is deleted. If not, the worker logs a warning message so that an administrator can diagnose why the result was sent to the wrong worker. In the case that the facility implements the option of having the Detector worker send result directly to the client, the Front-End Server will never get the result message back from the Detector. Consequently, the facility implements an expiration date with a tunable parameter specifying the amount of time to expire and delete a message (e.g., 10-minute expiration).

In some embodiments, the facility performs step MDP.1 by letting the client application send a handshake request to the Front-End Server. In some embodiments, the facility stores the server's parameters such that both the Front-End Server and the Detector can access them. Thus, the Front-End Server is capable of carrying out the handshake protocol with the client application without having to forward the request to the Detector. Similarly, in some embodiments, the facility stores the hash functions required to compute OPRF such that all workers have access to them. As a result, the client OPRF request in step MDP.3.a can be handled by the Front-End Server without involving the Detector, thus saving the extra communication overhead between the server's workers.

In some embodiments, the facility implements step MDP.2 at the initialization time of each Detector's cloud worker. To optimize initialization time, the facility performs step MDP.2 for only the first worker and then replicates the preprocessed data to any additional worker as needed. Once all workers are initialized, any cloud worker can be removed or added without affecting the rest.

In some embodiments, the facility implements steps MDP.4.b-c as part of the Detector workers. Because these computations can be intensive and require a long time to run, it is possible that a Detector worker dies or crashes due to unexpected error. In that case, the client detection request message could be lost inside a Detector worker. To prevent this from happening, in some embodiments, the facility implements persistent storage for the Detector worker which stores the client request message it is currently processing and deletes it once it is done. If the worker is restarted for some reasons, upon re-initialization, it will check if there are any remaining messages and if so continue executing the protocol. To prevent the worker from processing stale requests, each message in the persistent storage is time-stamped by the first time it is received by the worker. Before processing any such messages, the worker checks its timestamp and decides if it should be processed. This is controlled by a staleness parameter by the facility which can be adjusted for best performance and user experience. For example, the staleness parameter could be set to 10 minutes, in which case the worker discards any messages that are more than 10 minutes old.

Large-Scale Implementation 2: In some embodiments, the facility implements a cloud service consisting of only 2 components: Front-End Server and Detector. This implementation is similar to before except that the Message Store is now removed and that each Front-End Server worker maintains an internal message queue. Thus, the advantage of Large-Scale Implementation 1 is that the queue implementation and maintenance are both taken care of by Azure and can be trusted as robust solutions. On the other hand, maintaining an internal queue effectively eliminates the message size limit imposed by Azure queue services (such as Queue Storage or Service Bus). In some embodiments, the facility adaptively switches between different implementations to optimize performance and developer efforts. For implementation 2, as client request messages arrive, the Front-End Server first stores them in persistent storage, then forwards it to the next available Detector worker via some load-balancing scheme, such as round-robin. In some embodiments, the facility implements a publish/subscribe scheme so that each cloud worker can subscribe to process messages. In some embodiments, the facility implements traditional push-based communication from the Front-End Server to the Detector using the framework AKKA.NET or using raw TCP connection. This architecture is illustrated in FIG. 5A.

Figure 5A:
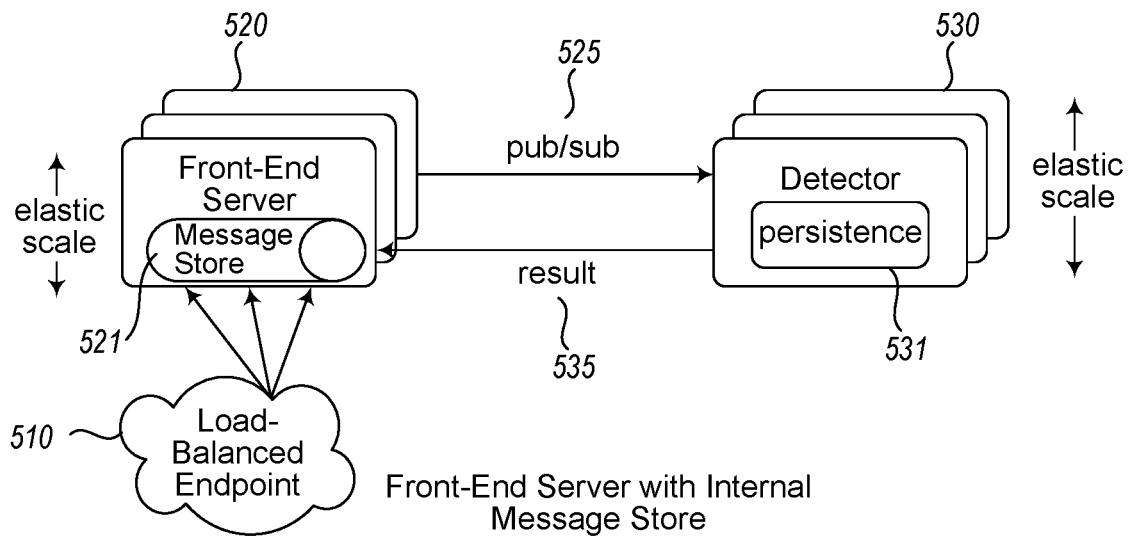
FIG. 5A shows a large-scale cloud implementation in which the external Message Store is removed and the Front-End Server now implements an internal persistent store.

FIG. 5A shows a large-scale cloud implementation in which the external Message Store is removed and the Front-End Server now implements an internal persistent store. A load-balanced endpoint 510 distributes requests to an elastically-scaled group of front-end servers 520, each having its own message store 521. The front-end servers publish 525 the messages, which are subscribed to by malware detectors in an elastically-scaled group 530 of malware detectors, each having their own persistence state 531. After subjecting a message to malware detection, a detector sends a result to the front-end server that published the message, which performs processing that is based upon the result.

Figure 5B:
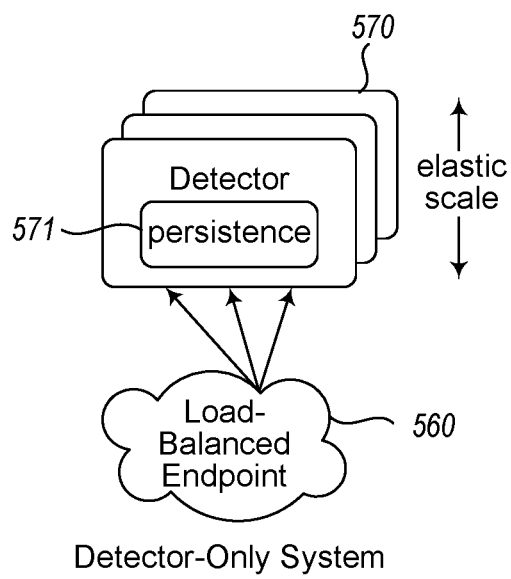
FIG. 5B is a large-scale cloud implementation in which the Front-End Server is also removed and now the Detector handles requests directly. In this architecture, the cloud load-balanced endpoint routes requests directly to a Detector worker for processing.

Large-Scale Implementation 3: In some embodiments, the facility implements a cloud service consisting of only the Detector component, as shown in FIG. 5B. FIG. 5B is a large-scale cloud implementation in which the Front-End Server is also removed and now the Detector handles requests directly. In this architecture, the cloud load-balanced endpoint routes requests directly to a Detector worker for processing. In this implementation, the Detector is still a set of Azure cloud service workers that sit behind a load-balanced endpoint and are configured for auto-scaling. The Detector now handles all of the following: receiving client requests, performing detection, and sending results back to client. In addition, the Detector also implements persistent storage, as outlined before, to make sure messages are not lost when a worker is restarted for any reason. Unlike implementation 1 & 2, this implementation only supports single-database static malware detection. Each detector worker has the same copy of the database and the cloud load-balanced endpoint simply forwards the client request message to the appropriate worker. Further, since there is no separate component to handle receiving & sending data to & from the client, and because the computation involved in the detection process can be very intensive, it is possible, but unlikely, that a Detector worker becomes too busy to accept new client messages. Thus, the facility only adaptively switches to this implementation when the volume of traffic is low and expected to remain low. The advantage of this implementation is the reduced cost in maintaining the cloud system as there are fewer workers that need to be created. A load-balanced endpoint 560 distributes message requests to malware detectors in an elastically-scaled group 570 of malware detectors, each having their own persistent state 571. Malware detector performs malware detection on each message, and takes action based upon the result.

Handling Backpressure: In implementation 1 and 2, if the rate of client messages arriving is much higher than the rate of processing by the Detector workers, this can create backpressure in the Message Store, requiring clients to wait longer to receive results. In some embodiments, the facility implements an auto-scaling feature that automatically increases the number of Detector workers when it detects backpressure. This is handled by having a separate cloud component called the Observer, whose job is only to observe the system's load and programmatically scales up or down other components as necessary. For implementation 3, as the Detector workers are directly supported by the cloud load-balanced endpoint, in some embodiments, the facility configures the workers to auto-scale using the built-in support of the cloud system, such as Azure Autoscale.

In some embodiments, the facility implements support for the removal & addition of a malware database for both Large-Scale Implementation 1 and 2 as follows. In the first implementation, when a database is removed, its corresponding set of cloud workers is automatically removed, thus nullifying the subscription to the Message Store. As a result, client request will no longer be processed against the removed database. Similarly, in the second implementation, if a database is removed, its workers are also removed. If the facility enables publish/subscribe scheme, no further action is needed. If the facility enables the push-based communication from the Front-End Server to the Detector, the Front-End Server automatically fails in sending client requests to these workers. To facilitate gracious failure in the push-based scheme, the facility maintains a mapping to the list of active workers that correspond to the currently active databases in the Front-End Server and removes the appropriate database from the mapping so that the Front-End Server does not try to push request to nonexistent workers. If a new database is added, in the first implementation, a new set of cloud workers is spawned up and subscribed to the Message Store. Thus, new client requests are automatically checked against the new database. Similarly, for the second implementation, the publish/subscribe scheme handles the additional database in the same way. For push-based scheme, the facility simply updates the mapping to include the new workers.

The inventors have recognized that malware databases must continuously evolve to keep track of the latest threats. As a result, in some embodiments, the facility implements support for updating existing databases in the distributed cloud implementations above. For both implementation 1 and implementation 2, the facility first creates a new set of cloud workers and perform step MDP.2 to initialize these workers with the new database. Once the new set of cloud workers are fully initialized, the facility adds the new set of cloud workers to the cloud system and removes the existing set of cloud workers that correspond to the old version of the database. Here, removal and addition are done in the same manner as previously described. Note that because addition of new workers is done before removal of the old ones, it is possible that the same client request would be checked against two different versions of the same database. To avoid duplicating the result, the facility implements a versioning scheme and have the Front-End Server detect the results and removes the older version's result before sending back to the client application. Database update is handled in implementation 3 using two options: (1) the facility requires a short shutdown period wherein client requests are not served so that the old set of workers can be fully winded down and the new workers swapped in, this avoids duplicate results from different versions; or (2) the facility allows duplicate results from different versions but modify the label of the malware to indicate the version of the database.

Unbalanced Database Size: In some embodiments, the facility implements support to better load balance the computational work when the different malware databases differ vastly in size. When one database is significantly larger than another, its cloud workers become stragglers and slow down the process which increases user-perceived latency. Thus, the facility splits each database into one or more smaller parts so that the size of each part is comparable to each other, improving the concurrency and processing latency. Note that this increases the amount of communication back to the client as the detection result against each database part is performed and sent separately.

Streaming Result to Client: The inventors have recognized that the number of malware databases can be large (>100) and thus it is not practical to wait for the detection to finish across all databases. Rather, in some embodiments, the facility implements support for streaming detection results back to the client applications as they are completed against each database. In both implementation 1 and implementation 2 above, as soon as a cloud service worker finishes its computation, the results are forwarded to the Front-End Server which immediately sends it back to the client for decryption. The client application displays each result to the user as soon as it receives them to create a seamless user experience. Similarly, in implementation 3, the Detector worker sends results back to the client as soon as they finished.

Client-Local Static Malware Detection, Private Database: The inventors have recognized that there are cases where a client user requires real-time static malware detection, in which the latency of the above implementations is too high. In such scenario, the user prefers to perform every operation locally on its premise to maximally optimize performance. This can be achieved if the server shares its entire malware database with the client user. However, malware database is often a proprietary asset which the company/owner is not willing to share. Thus, in some embodiments, the facility implements a method to allow the malware database owner to privately share the entire database with the user for local detection.

In some embodiments, the facility executes the OPRF step for every item in the server's database. That is, given the server items as $X=\{x_1, x_2, \ldots, x_{N_X}\}$, the server computes $x_i'$, $x_i''=OPRF_k(x_i)$ for every i, where k is a private key value only known by the server. Additionally, the server encrypts its set of labels (i.e., the type of malware) $L=\{l_1, \ldots, l_{N_X}\}$ as: $l_i'=l_i+x_i''$. Then, the server sends all $\{x_i'\}$ and $\{l_i'\}$ to the client, who cannot recover the set $\{x_i\}$ or $\{l_i\}$ and thus protecting the original database. In the online phase, when the client wishes to detect malware for a suspicious file, it interacts with the server to compute y', $y''=OPRF_k(y)$ using the blinded exponentiation protocol as outlined in Jarecki, S., & Liu, X. (2010, September), Fast secure computation of set intersection, In International Conference on Security and Cryptography for Networks (pp. 418-435), Springer, Berlin, Heidelberg, which is hereby incorporated by reference in its entirety. The client then checks if y'==x' and if so decrypts $l_i=l_i'-y''$. As this step requires a single round-trip communication and the computation involved is minimal, the client is able to achieve real-time processing. As the database can be quite large, the facility lets the server share the database with the client once at the beginning, before any online processing occurs.

Dynamic Malware Detection: The methods described so far apply to static malware detection where suspicious files are detected based on their static signatures. While static malware detection remains one of the most effective defenses against cyber-attacks, the inventors have recognized that they are susceptible to false negatives due to the many ways an attacker can obfuscate and modify malware signatures to evade detection. Recall that detection is done by an exact match with a known malware signature. If the content of the file is slightly modified, the signature would also change and thus exact match can no longer detect it unless the database is updated to include the new modified signature. With dynamic detection, the same issue no longer applies. This is because the suspicious file is executed in a controlled environment such as a sandbox or emulator. This process is sometimes referred to as malware detonation. The controlled environment has access to a range of monitoring tools to monitor and observe the file's actual running behavior. This behavior information includes data such as API calls, system calls, network activities, memory writes, etc. . . . . . Then, the security system can employ either manual inspection or automated analysis, such as using machine learning, to detect if the provided behavior is from a malware. Thus, if the attacker modifies the file's content, the execution behavior remains the same and can still be detected.

In some embodiments, the facility implements a method to perform dynamic malware detection given as input the behavior information extracted from the detonation process. This method protects the privacy of the client who desires to learn if the behavior is malicious but does not wish to share the result with outsiders. At a high level, the facility lets the client encrypt the behavior data, according to a predefined format and schema, and send the ciphertexts to the server. The server performs homomorphic operations, such as to execute a machine learning algorithm, to return an encrypted detection result. The client finally receives and decrypts the detection result with its private key.

In some embodiments, the facility trains a machine learning model, in the offline phase, to be used by the server to predict whether the provided behavior data is malware or benign. The model training uses data from known malware behavior and is done entirely in plaintext. As this process is completely contained within the server, there is no concern about privacy or security of the data. In the online phase, the server executes the machine learning model in inference mode over homomorphic ciphertexts, which returns predictions that are also encrypted. To make sure the model is up to date with latest threat, the offline model training process is repeated periodically as soon as new malware data is available.

While there are numerous machine learning algorithms that are suitable for malware detection, in some embodiments, the facility only employs algorithms that can efficiently run in inference mode over homomorphically encrypted data. That is, under inference mode, the model must satisfy the maximum multiplicative depth limit imposed by the underlying encryption parameters. For example, support vector machines only require a multiplicative depth of 1 in inference mode, and neural networks with 2 convolutional layers and one squared activation layer requires a depth of 3.

In some embodiments, the facility implements a protocol to allow the client and server to securely and privately exchange data, similar to that of static detection. Specifically, the client and server first engages in a handshake protocol to agree on encryption parameters, security settings, and encryption schema. Here, encryption schema specifies how the data needs to be encrypted, such as whether batching is used to pack and encrypt multiple values in the same ciphertext. Once the handshake is performed and the server has completed training the model offline, the client and server proceed to carry out the dynamic detection steps. The high-level protocol is described as follows.

Dynamic Detection Protocol (DDP)
1. The client and server initially agree on the encryption parameters, security settings, and other parameters required to carry out the protocol. This step needs to be done only once before their interactions begin.
2. In the offline phase, the server trains a machine learning model to detect malware based on plaintext behavior data. The training process is repeated whenever new data is available.
3. The client performs malware detonation on one or more suspicious files to collect behavior information. The client further preprocesses these behavior data into a format as agreed upon in step 1.
4. In the online phase:
    a. The client encrypts the formatted data according to the encryption schema as agreed upon in step 1 and sends the ciphertexts to the server.
    b. The server executes the pretrained malware detection model in inference mode using homomorphic operations and sends encrypted predictions back to the client.
    c. The client decrypts the prediction results.

Large-Scale Implementations: In some embodiments, the facility implements a scalable cloud system to efficiently perform the DDP protocol above. In particular, the facility implements the client application in a similar manner to that for static detection. The primary difference is that now the client application does not generate file signatures but rather takes in as input behavior data from the detonation process, which was done previously and separately from the client application. In some embodiments, the facility employs any one of the previously described Large-Scale Implementation 1, 2, or 3, whichever achieves the best balance of high performance, low maintenance, and low cost given the current and expected traffic volume. These architectures are illustrated in FIGS. 4-6.

Model Update: In some embodiments, the facility implements a method to support updating the server's model when a new one has been trained and ready for deployment. As the model runs inside the Detector workers, the facility either updates the workers to load the new model version or creates new workers with the new model version preloaded. In some embodiments, the Detector workers periodically observe if a new model version has been released and if so, it loads the new model and swaps out the currently active model. In some embodiments, each Detector worker holds multiple copies of the latest model and executes them in different threads, with each thread responding to one client request. For example, each model copy is held inside an Akka.Net actor and thus a single Detector worker contains multiple actors. When a new model version is detected, the Detector worker spawns up new actors with copies of the new model and eventually shuts down the existing actors once their computations are completed. In some embodiments, the facility alternatively creates a new set of Detector workers with the new version of the model preloaded. It then routes all new requests to the new set of workers and eventually, once the existing workers no longer have any messages to process, they are shut down and removed from the pool.

Model Versioning: In some embodiments, the facility implements a model versioning scheme so that each inference operation made by the Detector worker can be tied to a specific model version. Additionally, the client request Id is also tied to the same model version so that if the client wishes to file a bug report, the request Id can be retrieved and the appropriate model can be loaded on the server side for diagnostics and debugging. In production, when a model is not performing as well as one of its previous versions, the facility performs a rollback operation in which it sets an older version as the currently deployed version and, using the method above, the Detector workers are updated accordingly.

Binary-Based Malware Detection: While dynamic malware detection can provide better accuracy and robustness against the evolving attacker, in order to trigger the full malware behaviors, oftentimes one needs to detonate the malware within many variations of the controlled environments. This is because some malware does not trigger until certain conditions are met in the system. Thus, in many cases, dynamic analysis requires massive computer resources, and consequently investment, to be effective. An alternative method employed by modern approaches to malware detection is to apply machine learning algorithms directly to the file's binary content and opcode sequences and outputs a binary prediction of malware or benign.

In some embodiments, the facility implements a method for the client application to convert a suspicious file's binary content to a grayscale image. This is outlined in Yan, J., Qi, Y., & Rao, Q. (2018), Detecting malware with an ensemble method based on deep neural network, Security and Communication Networks, 2018, which is hereby incorporated by reference in its entirety. The binary content is first viewed as an array of bits and every 8-bit block is treated as the intensity of the grayscale pixel (from 0 to 255). The resulting array of pixels is then converted into a square N×N image, where N is a tunable parameter of the system. If the number of pixels is less than $N^2$, additional padding pixels of value 0 are added to fill in the empty slots. If the number of pixels is greater than $N^2$, they are first converted into a N'×N' image, with N'>N, which is then down-sampled to N×N using traditional techniques such as bilinear interpolation. The client then encrypts the resulting image and sends it to the server for detection.

In some embodiments, the facility implements a method for the client application to extract opcode sequences from a given file using de-compilation. The method for extraction is outlined in Yan, J., Qi, Y., & Rao, Q. (2018), Detecting malware with an ensemble method based on deep neural network, Security and Communication Networks, 2018. In addition to the grayscale image, the client application can further encrypt and send the opcode sequences to the server for processing.

Large-Scale Implementations: In some embodiments, the facility implements a scalable cloud system to efficiently perform binary-based malware detection. The client application is implemented similarly to that for static detection except that it now generates grayscale image and opcode sequences instead of static signatures. In some embodiments, the facility employs any one of the previously described Large-Scale Implementation 1, 2, or 3, whichever achieves the best balance of high performance, low maintenance, and low cost given the current and expected traffic volume. Model update and versioning are handled in the same manner as done for DDP. These architectures are illustrated in FIGS. 4-6.

In some embodiments, the facility generalizes methods described in this document to implement large-scale systems for applications beyond malware detection, where the server has no ability to see the content of the data sent from the client. In some embodiments, the facility's implementations can be applied to (but not limited to): Zero-Knowledge Credential Check, where a user wishes to check if a given credential, e.g., password or credit card, has been stolen by hackers without revealing the result to anyone; Background Check, where a department wishes to query an individual's information against a service provider without revealing the information or the background check result; Private Information Retrieval, where a user wishes to obtain sensitive information from an untrusted third-party server.

Hardware Details

Figure 7:
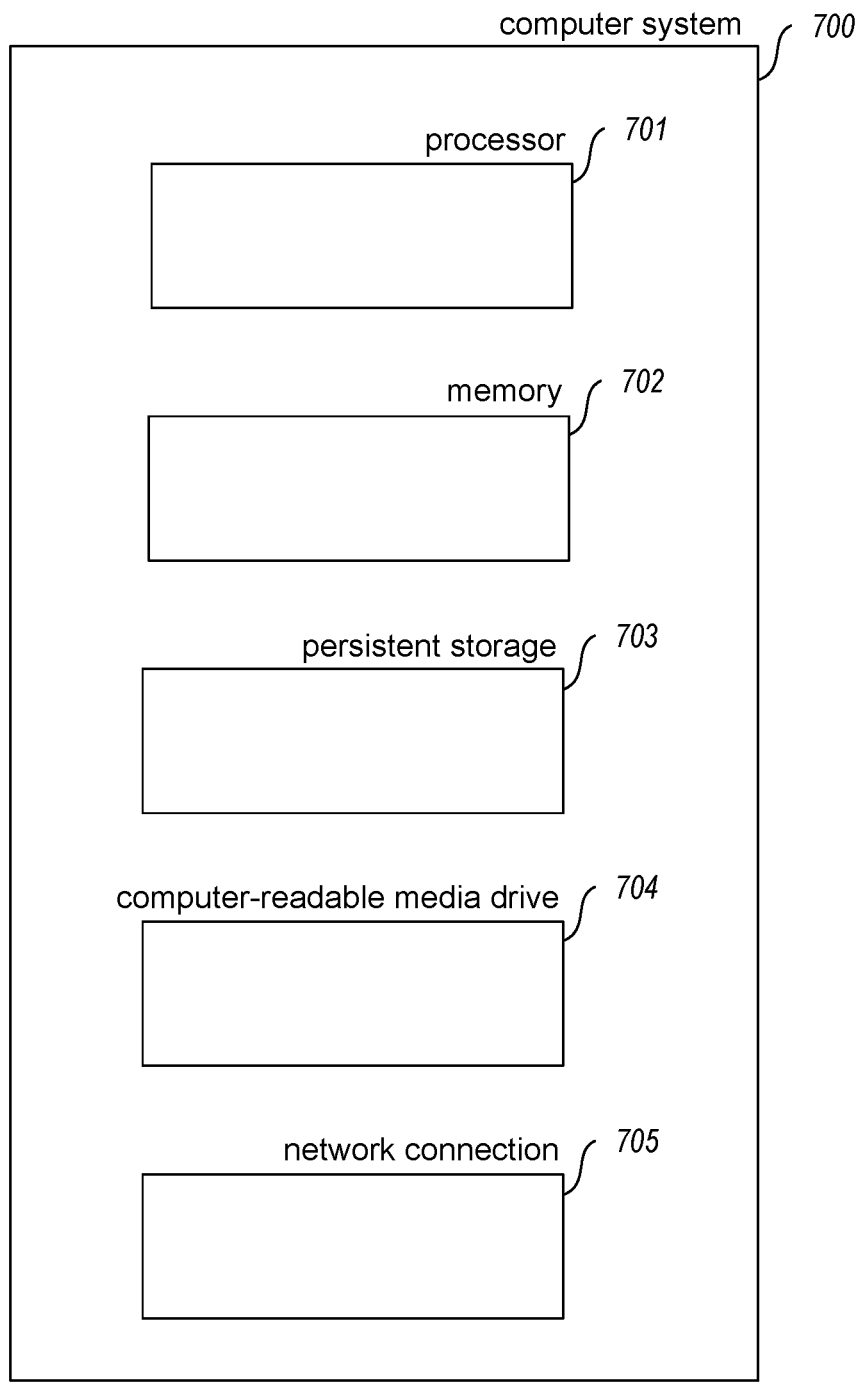
FIG. 7 is a block diagram showing some of the components typically incorporated in at least some of the computer systems and other devices on which the facility executes.

FIG. 7 is a block diagram showing some of the components typically incorporated in at least some of the computer systems and other devices on which the facility executes. In various embodiments, these computer systems and other devices 700 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 701 for executing computer programs, such as a central processing unit (CPU), graphics processing unit (GPU), tensor processing unit (TPU), and field-programmable gate array (FPGA); a computer memory 702 for storing programs and data while they are being used, including the facility and associated data, an operating system including a kernel, and device drivers; a persistent storage device 703, such as a hard drive or flash drive for persistently storing programs and data; a computer-readable media drive 704, such as a floppy, CD-ROM, or DVD drive, for reading programs and data stored on a computer-readable medium; and a network connection 705 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations and having various components.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method in a computing system, comprising:
in a first computer system:
   receiving from a second computer system ciphertext obtained by subjecting plaintext file contents to homomorphic encryption;
   performing a malware detection operation directly on the received ciphertext to produce an encrypted detection result, wherein the performed malware detection operation compares the ciphertext to hash values obtained for known malware; and returning the produced encrypted detection result to the first computer system; and in the second computer system:
hashing an input file into a hash value to obtain the plaintext file;
subjecting the plaintext file to homomorphic encryption using a distinguished key to obtain the ciphertext;
transmitting the obtained ciphertext to the first computer system;
receiving the encrypted detection result returned by the first computer system; and
using the distinguished key to decrypt of the received encrypted detection result.

2. The method of claim 1 wherein the encrypted detection result—once decrypted—indicates whether the plaintext file contains malware.

3. The method of claim 1 wherein the encrypted detection result—once decrypted—identifies a type of malware contained by the plaintext file.

4. The method of claim 1, further comprising:
for each of a plurality of databases:
retrieving from the database one or more hash values obtained for known malware;
aggregating the retrieved hash values,
and wherein it is the aggregated hash values to which the ciphertext is compared by the malware detection operation.

5. The method of claim 1, further comprising:
in the second computer system:
transforming an input file into a grayscale image to obtain the plaintext file,
and wherein the performed malware detection operation subjects the ciphertext to a machine learning model trained using grayscale images obtained by transforming known malware into grayscale images.

6. The method of claim 5, further comprising:
recurringly:
collecting an updated set of grayscale images representing known malware; and
training a new version of the machine learning model,
and wherein the machine learning model to which the ciphertext is subjected by the malware detection operation is the latest-trained version of the machine learning model.

7. The method of claim 1, further comprising:
in the second computer system:
executing an input file inside a sandbox;
collecting behavioral information describing the execution of the input file to obtain the plaintext file,
and wherein the performed malware detection operation subjects the ciphertext to a machine learning model trained using behavioral information obtained by executing known malware.

8. The method of claim 7, further comprising:
recurringly:
collecting an updated set of behavioral information representing known malware; and
training a new version of the machine learning model,
and wherein the machine learning model to which the ciphertext is subjected by the malware detection operation is the latest-trained version of the machine learning model.

9. A method in a computing system, comprising:
in a first computer system:
receiving from a second computer system ciphertext obtained by subjecting plaintext file contents to homomorphic encryption;
performing an analysis operation directly on the received ciphertext to produce an encrypted detection result, wherein the performed analysis operation subjects the ciphertext to a machine learning model trained using grayscale images obtained by transforming known malware into grayscale images; and
returning the produced encrypted detection result to the first computer system; and
in the second computer system:
transforming an input file into a grayscale image to obtain the plaintext file;
subjecting the plaintext file to homomorphic encryption using a distinguished key to obtain the ciphertext;
transmitting the obtained ciphertext to the first computer system;
receiving the encrypted detection result returned by the first computer system; and
using the distinguished key to decrypt the received encrypted detection result.

10. The method of claim 9 wherein the plaintext file contents comprise a payment or access credential,
and wherein the analysis operation determines whether the payment or access credential has been compromised.

11. The method of claim 9 wherein the plaintext file contents comprise identifying information for an individual,
and wherein the analysis operation determines background check results for the individual.

12. The method of claim 9 wherein the plaintext file contents comprise a query,
and wherein the analysis operation determines a result for the query.

13. One or more instances of computer-readable media collectively having contents configured to cause a computing system to perform a method, the method comprising:
in a first computer system:
executing an input file inside a sandbox;
collecting behavioral information describing the execution of the input file to obtain the plaintext file;
subjecting a plaintext file to homomorphic encryption using a distinguished key to obtain ciphertext;
transmitting the obtained ciphertext to a second computer system;
receiving an encrypted detection result returned by the second computer system obtained by performing a malware detection operation directly on the ciphertext, wherein the performed malware detection operation subjects the ciphertext to a machine learning model trained using behavioral information obtained by executing known malware; and
using the distinguished key to decrypt of the received encrypted detection result.

14. The one or more instances of computer-readable media of claim 13, the method further comprising:
in the first computer system:
hashing an input file into a hash value to obtain the plaintext file,
and wherein the performed malware detection operation compares the ciphertext to hash values obtained for known malware.

15. The one or more instances of computer-readable media of claim 14, the method further comprising:
for each of a plurality of databases:
retrieving from the database one or more hash values obtained for known malware;
aggregating the retrieved hash values,
and wherein it is the aggregated hash values to which the ciphertext is compared by the malware detection operation.

16. The one or more instances of computer-readable media of claim 13, the method further comprising:

in the first computer system:
transforming an input file into a grayscale image to obtain the plaintext file,
and wherein the performed malware detection operation subjects the ciphertext to a machine learning model trained using grayscale images obtained by transforming known malware into grayscale images.

17. The one or more instances of computer-readable media of claim 16, the method further comprising:
recurringly:
collecting an updated set of grayscale images representing known malware; and
training a new version of the machine learning model,
and wherein the machine learning model to which the ciphertext is subjected by the malware detection operation is the latest-trained version of the machine learning model.

18. The one or more instances of computer-readable media of claim 13, the method further comprising:
recurringly:
collecting an updated set of behavioral information representing known malware; and
training a new version of the machine learning model,
and wherein the machine learning model to which the ciphertext is subjected by the malware detection operation is the latest-trained version of the machine learning model.

* * * * *